(12) United States Patent
Minaguchi et al.

(10) Patent No.: US 7,652,729 B2
(45) Date of Patent: Jan. 26, 2010

(54) DISPLAY DEVICE INCLUDING A FLEXIBLE GUIDE MEMBER BETWEEN THE DISPLAY DEVICE AND A CUSHIONING MEMBER

(75) Inventors: Hiroyuki Minaguchi, Higashimatsuyama (JP); Yasuyuki Horii, Oume (JP); Masanori Sato, Oume (JP); Tomohiro Hamada, Hamura (JP); Hidemi Itakura, Tokyo (JP); Noriyasu Kawamura, Yokohama (JP); Toshio Ooe, Oume (JP); Hiroyuki Takahashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 11/208,058

(22) Filed: Aug. 19, 2005

(65) Prior Publication Data

US 2006/0066769 A1 Mar. 30, 2006

(30) Foreign Application Priority Data

Sep. 28, 2004 (JP) .......................... P2004-282102

(51) Int. Cl.
G02F 1/1333 (2006.01)
(52) U.S. Cl. .......................................... 349/58; 349/60
(58) Field of Classification Search ............. 349/58–60; 361/681
See application file for complete search history.

(56) References Cited

U.S. PATENT DOCUMENTS

| | | | |
|---|---|---|---|
| 6,989,986 B2 * | 1/2006 | Kumagai et al. | 361/681 |
| 2002/0149714 A1 * | 10/2002 | Anderson et al. | 349/59 |
| 2003/0128307 A1 * | 7/2003 | Ito et al. | 349/58 |
| 2004/0182979 A1 * | 9/2004 | Krzoska et al. | 248/316.8 |
| 2005/0264712 A1 * | 12/2005 | Kim et al. | 349/58 |
| 2006/0181843 A1 * | 8/2006 | Takahashi | 361/681 |

FOREIGN PATENT DOCUMENTS

| | | |
|---|---|---|
| CN | 1497924 | 5/2004 |
| JP | 10-039280 | 2/1998 |
| JP | 11-109878 | 4/1999 |
| JP | 2000-105628 | 1/2000 |

* cited by examiner

*Primary Examiner*—David Nelms
*Assistant Examiner*—Jessica M Merlin
(74) *Attorney, Agent, or Firm*—Blakely, Sokoloff, Taylor & Zafman LLP (57) ABSTRACT

An electronic apparatus includes a cover, a rib, an elastic member, and a mask. A non-display surface of a display device is covered with the cover. The cover has a bottom wall and an side wall. The rib is disposed between a side portion of the display device and the side wall of the cover so as to be located in a position separate from the side wall. The rib rise out of the bottom wall of the cover. The elastic members is attached to at least one of an inner surface of the bottom wall and an inner surface of the rib facing the side portion of the display device. The elastic members retain the display device. The mask is fixed to the cover while exposing a display surface of the display device.

21 Claims, 6 Drawing Sheets

DISPLAY DEVICE INCLUDING A FLEXIBLE GUIDE MEMBER BETWEEN THE DISPLAY DEVICE AND A CUSHIONING MEMBER

CROSS-REFERENCE TO RELATED APPLICATIONS

This application is based upon and claims the benefit of priority from the prior Japanese Patent Application No. 2004-282102, filed on Sep. 28, 2004; the entire contents of which are incorporated herein by reference.

BACKGROUND

1. Field

Embodiments of the invention relate to an electronic apparatus which is contrived to relax shock on a display of the electronic apparatus.

2. Description of the Related Art

An electronic apparatus has been disclosed in JP-A-2000-105628 in which a portable personal computer provided with a liquid crystal display device is taken as an example of the electronic apparatus. In the electronic apparatus, the liquid crystal display device is received and fixed in a display portion. In order to protect the liquid crystal display device from shock due to external force or deformation of an outer shell, the liquid crystal display device is surrounded by an elastic member made of high-density rubber or gel.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION

An electronic apparatus according to an embodiment of the invention will be described with reference to FIGS. 1 to 9 in the case where a portable computer 1 is taken as an example of the electronic apparatus. The portable computer 1 includes a body 2, and a display unit 3. The display unit 3 is connected to the body 2 by hinges 4 so that the display unit 3 can rotate between a position where the display unit 3 overlaps with the body 2 and a position where the display unit 3 rises out of the body 2.

Figure 1:
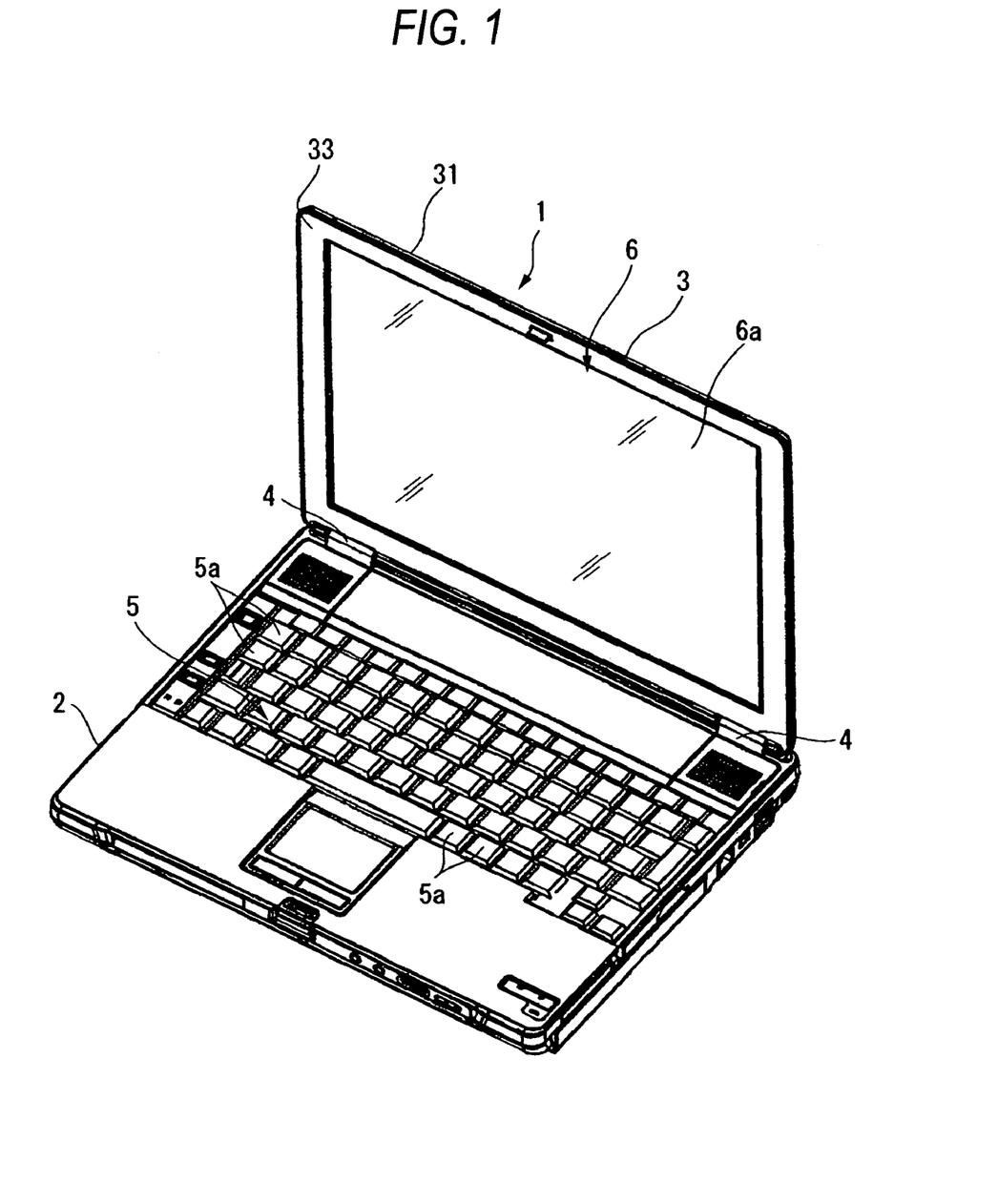
FIG. 1 is an exemplary perspective view showing an electronic apparatus according to an embodiment of the invention.
Figure 2:
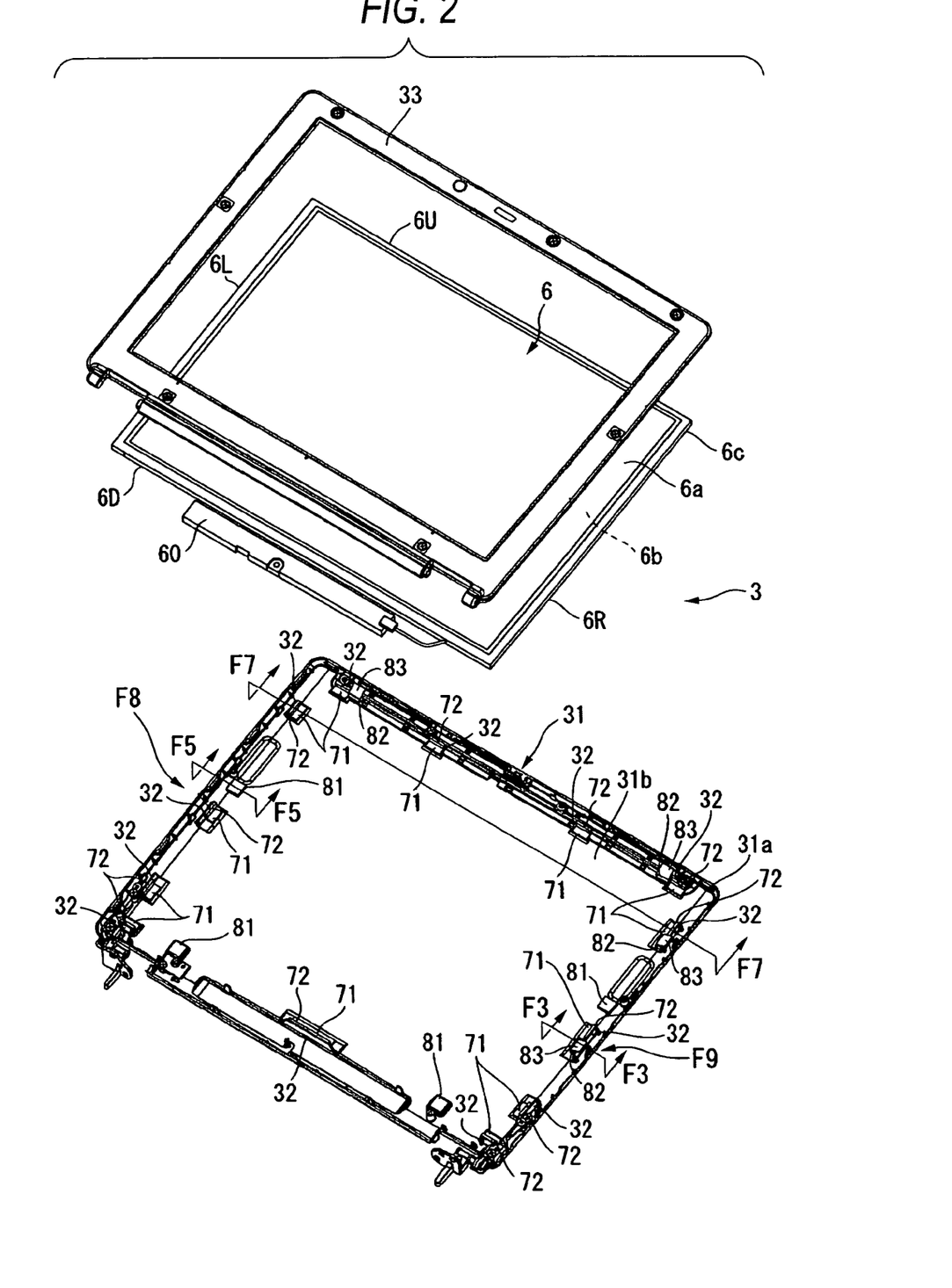
FIG. 2 is an exemplary exploded perspective view showing a display unit depicted in FIG. 1.
Figure 3:
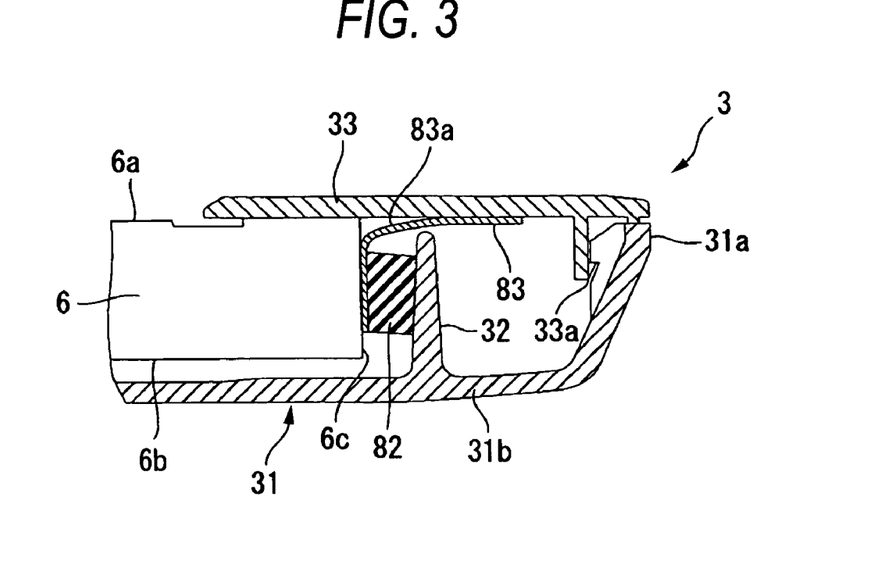
FIG. 3 is an exemplary sectional view of the display unit taken along the line F3-F3 in FIG. 2.
Figure 4:
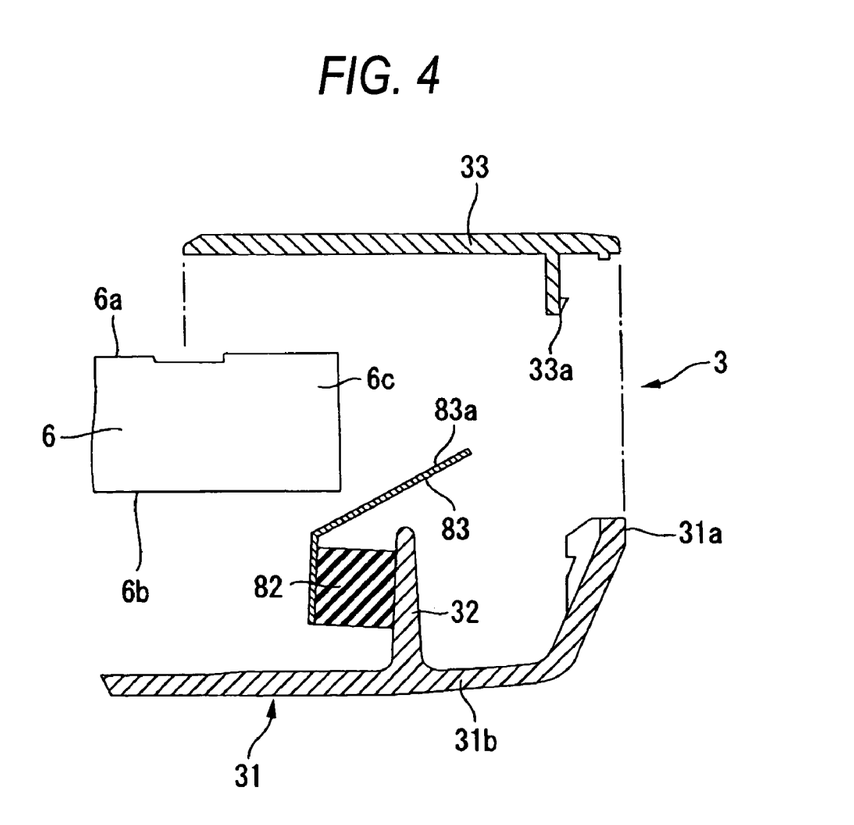
FIG. 4 is an exemplary exploded sectional view of the display unit depicted in FIG. 3.
Figure 5:
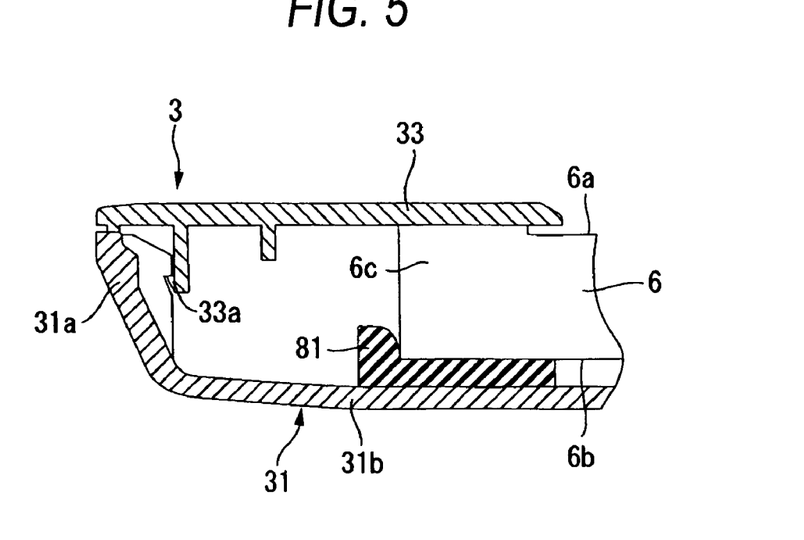
FIG. 5 is an exemplary sectional view of the display unit taken along the line F5-F5 in FIG. 2.
Figure 6:
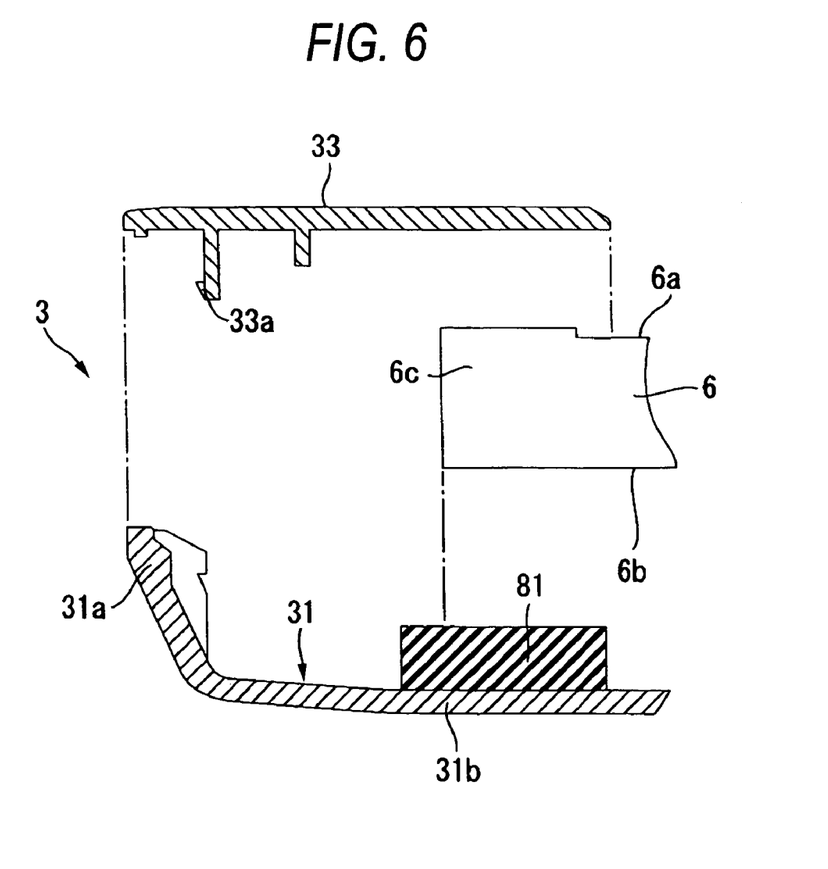
FIG. 6 is an exemplary exploded sectional view of the display unit depicted in FIG. 5.
Figure 7:
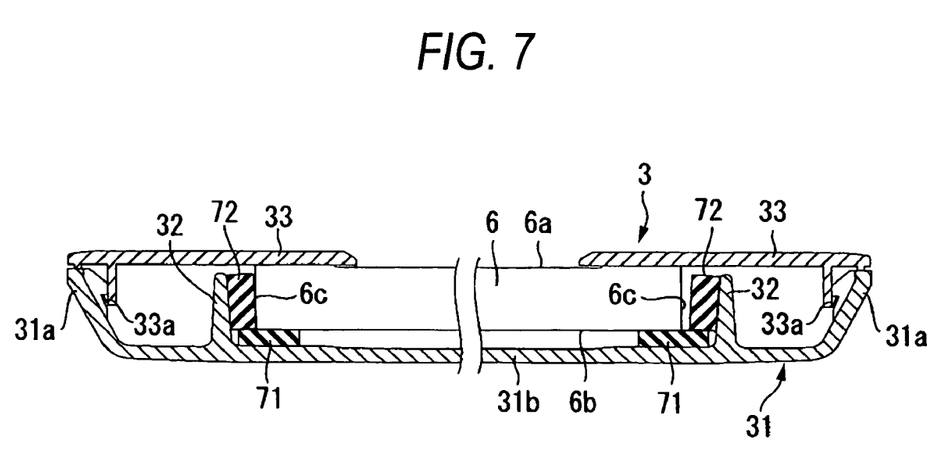
FIG. 7 is an exemplary sectional view of the display unit taken along the line F7-F7 in FIG. 2.
Figure 8:
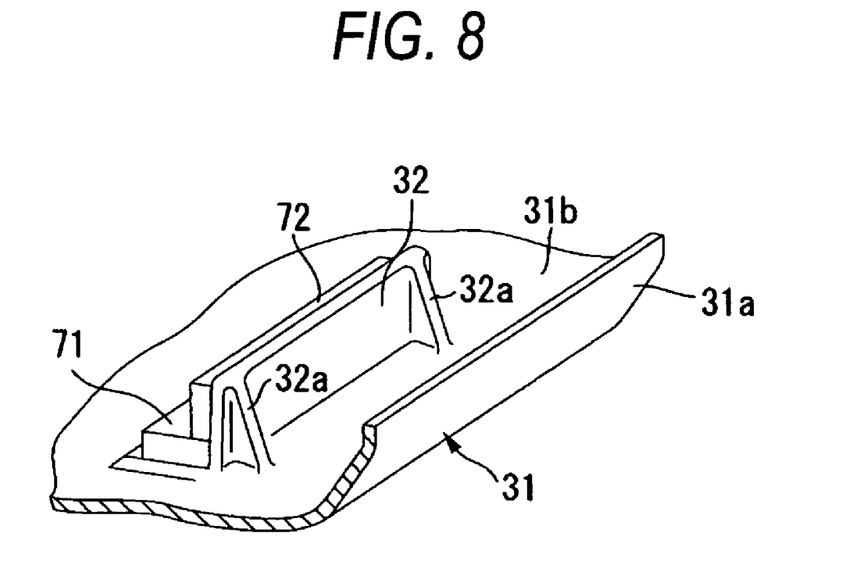
FIG. 8 is an exemplary perspective view of a portion represented by F8 in a cover depicted in FIG. 2.
Figure 9:
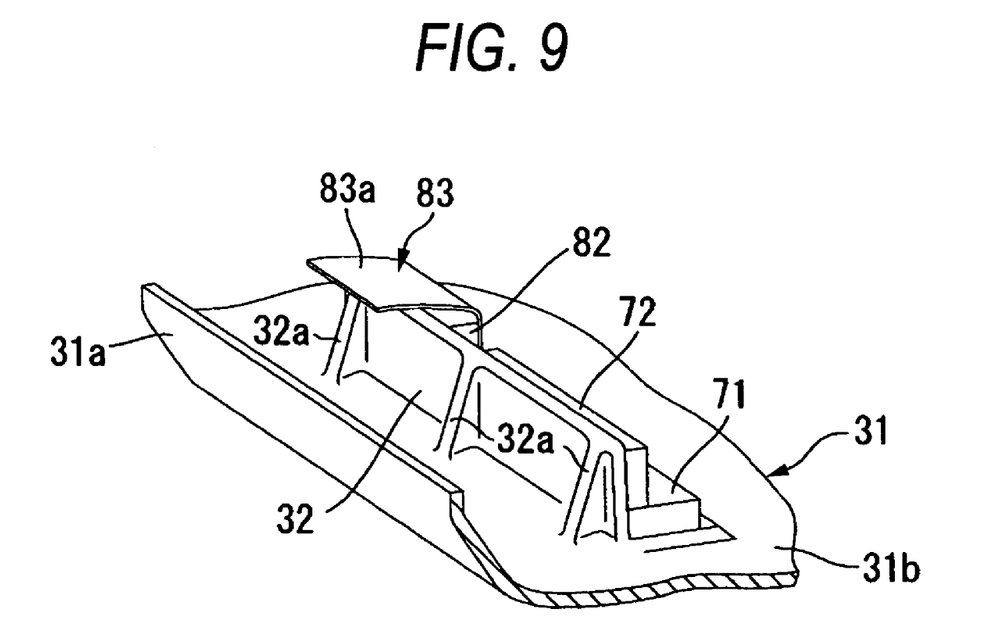
FIG. 9 is an exemplary perspective view of a portion represented by F9 in the cover depicted in FIG. 2.

A keyboard 5 having keys 5a arranged for an input operation is provided in an upper surface of the body 2. The display unit 3 has a display device 6 which has a display surface 6a facing the keyboard 5 in the state that the display unit 3 is raised (opened) with respect to the body 2 as shown in FIG. 1. The display device 6 is flat and rectangular in outer shape. For example, the display device 6 is a liquid crystal display having a laminate of a glass substrate and a backlighting light guide plate. As shown in FIG. 2, an inverter 60 for turning on a backlighting cold-cathode tube is connected to the display device 6. The inverter 60 together with the display device 6 is received in the display unit 3. Incidentally, the display device 6 may be a plasma display, an organic electroluminescence display, a surface-conduction electron-emitter display, or the like.

As shown in FIG. 2, the display unit 3 has a cover 31, a display device 6, ribs 32, elastic members, and a mask 33. The cover 31 has a side wall 31a and a bottom wall 31b, which cover a non-display surface 6b of the display device 6. The ribs 32 are disposed between a side portion 6c of the display device 6 and the side wall 31a of the cover 31 so that the ribs 32 rise out of the bottom wall 31b of the cover 31 in a direction of crossing the display surface 6a of the display device 6 in positions separate from the side wall 31a. The ribs 32 have reinforcing ribs 32a extending to a side opposite to a side facing the side portion 6c of the display device 6.

Two kinds of members, that is, shock absorbing members and cushioning members, are used as the elastic members. As each of the shock absorbing members, there is used a member which has stiffness enough to retain a contact surface between the member and the display device 6 in a steady state where the portable computer 1 is used and which has a damping factor enough to absorb shock in such a manner that the member is flattened to prevent propagation of shock to the display device 6 when shock is applied on the display unit. As each of the cushioning members, there is used a member which has flexibility and elasticity enough to position the display device 6 in a predetermined position of the display unit in such a manner that the member is flattened in a steady state. The shock absorbing members are constituted by first shock absorbing members 71 and second shock absorbing members 72. The cushioning members are constituted by first cushioning members 81 and second cushioning members 82.

The first shock absorbing members 71 are attached to an inner surface of the bottom wall 31b so as to be located near the side portion 6c of the display device 6. The first shock absorbing members 71 abut on a non-display surface 6b of the display device 6. The second shock absorbing members 72 have contact surfaces in a direction of crossing the display surface 6a of the display device 6. The second shock absorbing members 72 are attached to inner surfaces of the ribs 32 facing the side portion 6c of the display device 6.

The distances between the contact surfaces of the second shock absorbing members 72 attached to the ribs 32 arranged along edges 6U and 6D, and 6L and 6R as two pairs of opposite surfaces of the display device 6 corresponding to opposite sides of a rectangle are set to be larger than the maximum values within tolerable production error of distances between opposite surfaces of the side portion 6c of the display device 6. That is, the display device 6 can be put between the second shock absorbing members 72 with gaps.

The first cushioning members 81 are attached to the inner surface of the bottom wall 31b so as to be located near the side portion 6c of the display device 6. The first cushioning members 81 abut on the non-display surface 6b of the display device 6 and have restoring force that urges the display device toward a side opposite to the side of the bottom wall 31b. That is, the first cushioning members 81 urge the display device 6 outward from the cover 31. The second cushioning members 82 are attached to the inner surfaces of the ribs 32 arranged along the side portion 6c of the display device 6 corresponding to two adjacent sides of the rectangle. Specifically, two second cushioning members are arranged along each of the edges 6U and 6R which are located on an upper side and a right side respectively when viewed from the display surface 6a in the condition that the display unit 3 is opened. The second cushioning members 82 have contact surfaces that abut on the side portion 6c of the display device 6 and have restoring force that urges the display device 6 inward with respect to the ribs 32. As a result, the display device 6 is urged toward the left lower side when viewed from the display surface 6a side.

Guide members 83 are attached to the contact surfaces of the second cushioning members 82 abutting on the side portion 6c of the display device 6. The guide members 83 have inclined surfaces 83a which extend outward to the outside of the side portion 6c of the display device 6 from the contact surfaces of the second cushioning members 82 so as to be widened (opened) in a direction of departing from the cover 31. The guide members 83 are provided for preventing the second cushioning members 82 from being hindrance for the display device 6 when the display device 6 is intended to be put into the cover 31. The guide members 83 guide the second cushioning members 82 to press and contract the second cushioning members 82 to the position of the side portion 6c of the display device 6. The provision of the guide members 83 permits the display device 6 to be mounted smoothly.

After the display device 6 and the inverter 60 connected to the display device 6 are put in the cover 31, the mask 33 is attached to the display device 6 from the display surface 6a side. The mask 33 has an engagement portion 33a which is provided along the side wall 31a of the cover 31 so that the mask 33 is fixed to the cover 31 by the engagement portion 33a. As a result, the mask 33 presses the edge of the display surface 6a of the display device 6 toward the cover 31 against the restoring force of the first cushioning members 81. The display device 6 is retained in the inside of the display unit 3 without any looseness. The mask 33 is further screwed to the cover 31 in a position separate from the ribs 32.

As a specific member used as each of the shock absorbing members, there is preferably used urethane rubber, silicone rubber, or the like, having a Shore hardness of about 30 as a restitution hardness and a Shore A hardness of about 25 to 45 as an indentation hardness. As a specific material used as the cushioning members, there is preferably used a material having restoring force enough to press the display device in the display unit in a steady state without any looseness. For example, sponge, foamed urethane, or the like, can be preferably used as the material of the cushioning members.

These elastic members may be disposed separately and intermittently in a plurality of places as long as each of the elastic members has a sectional area necessary for absorbing shock imposed on the display device 6 or for retaining the display device 6. The length of each elastic member in the direction along the side portion 6c of the display device 6 and the width thereof in the direction along the display surface 6a of the display device 6 can be changed suitably in order to ensure a required contact area.

Characteristics such as restitution coefficients, attenuation factors and hardnesses of the shock absorbing members and the cushioning members shown in this embodiment are only examples. Accordingly, these elastic members may be selected suitably in accordance with the size and weight of the display device 6.

In the portable computer 1 configured as described above, the display device 6 is retained in the display unit 3 by the elastic members (the first shock absorbing members 71, the second shock absorbing members 72, the first cushioning members 81 and the second cushioning members 82). In this case, the first shock absorbing members 71 suffer a load in an out-of-plane direction of crossing the display surface 6a whereas the second shock absorbing members 72 suffer a load in an in-plane direction along the display surface 6a. The first cushioning members 81 prevent displacement of the display device 6 in the out-of-plane direction while the display device 6 is clamped between each first cushioning member 81 and the mask 33. The second cushioning members 82 press the display device 6 against the second shock absorbing members 72 disposed on the opposite side with respect to the display device 6, so that the second cushioning members 82 prevent displacement of the display device 6 in the in-plane direction.

The second shock absorbing members 72 which absorb shock in the direction along the display surface 6a are supported by the ribs 32 provided separately from the side wall 31a of the cover 31. For this reason, there is no shock transmitted from the outer circumference of the display unit 3 directly to the ribs 32 which retain the display unit 3. Accordingly, even if the electronic apparatus is knocked against something or dropped by mistake when the electronic apparatus is carried, there is no shock directly applied on the display device 6.

Particularly, the portable computer 1 is often carried in the condition that the display unit 3 is superimposed (closed) on the body 2. When the portable computer 1 is knocked against something or dropped in such a condition, the portable computer 1 suffers shock from the side wall 31a side of the display unit 3 more frequently than the portable computer 1 suffers shock from the bottom wall 31b side of the cover 31. That is, shock in the in-plane direction along the display surface 6a is applied on the display device 6 more frequently than shock in the out-of-plane direction of crossing the display surface 6a is applied on the display device 6. As the size of the display device 6 increases, the shock in the direction (in-plane direction) along the display surface 6a increases because the weight of the display device 6 increases.

Since the display device 6 of the portable computer 1 is retained by the elastic members (the first shock absorbing members 71, the second shock absorbing members 72, the first cushioning members 81 and the second cushioning members 82), the display device 6 can be flexibly displaced in the inside of the display unit 3 even in the case where shock is applied on the display device 6. Accordingly, the shock can be dodged, so that the display device 6 can be rescued from damage.

Although the portable computer 1 has been described as an example of the electronic apparatus, the display device-retaining structure according to the invention may be used for the electronic apparatus provided with the display device 6, for example, an electronic apparatus provided with a display device such as a cellular phone, a personal digital assistant (PDA), or a digital camera. The display device-retaining structure according to the embodiment may be also effectively used for a structure for retaining a storage device provided with a precise drive portion in place of the display device.

What is claimed is:

1. An electronic apparatus comprising:
   a body;
   a display unit rotatably connected to the body, the display unit comprises:
   a display device;
   a cover covering a rear of the display device, and having a bottom wall and a side wall;
   a rib disposed between a side portion of the display device and the side wall of the cover;
   an elastic member attached to at least one of a surface of the rib facing the side portion of the display device and an inner surface of the bottom wall, the elastic member includes a first cushioning member having a contact surface that abuts on a side portion of the display device and a guide member having an inclined surface that extends from the contact surface outwardly from the side portion of the display device, the guide member being made of a flexible material and positioned between the display device and the first cushioning member; and
   a mask fixed to the cover so as to expose a display surface of the display device.

2. The electronic apparatus according to claim 1, wherein the elastic member further comprises:
   a shock absorbing member that is deformed to damp a load transmitted to the display device when shock is applied on the display unit; and
   the first cushioning member having a restoring force that urges the display device inward with respect to the rib.

3. The electronic apparatus according to claim 1, wherein the elastic member further comprises:
   a first shock absorbing member abutting on the non-display surface of the display device;
   a second shock absorbing member having a contact surface along a direction of crossing the display surface and attached to the inner surface of the rib facing the side portion of the display device; and
   a second cushioning member abutting on the non-display surface of the display device and having restoring force that urges the display device toward a side opposite to the bottom wall.

4. The electronic apparatus according to claim 3, wherein the side portion of the display device is shaped like a rectangle;
   the second shock absorbing member comprises a plurality of second shock absorbing members; and
   a distance between the contact surface of the second shock absorbing members arranged along opposite surfaces of the display device corresponding to opposite sides of the rectangle are set to be larger than a maximum value within tolerable production error of a distance between opposite surfaces of the side portion of the display device.

5. The electronic apparatus according to claim 3, wherein the inclined surface of the guide member of the first cushioning member extends from the contact surfaces of the second cushioning member upwardly and outwardly to the side portion of the display device.

6. The electronic apparatus according to claim 3, wherein the side portion of the display device is shaped like a rectangle;
   the second shock absorbing member comprises a plurality of second shock absorbing members; and
   the first cushioning member comprise a plurality of cushioning members disposed along two adjacent sides of the rectangle.

7. The electronic apparatus according to claim 1, wherein the rib has a reinforcing rib extending to a side opposite to the display device.

8. An electronic apparatus according to claim 1, wherein the elastic member comprises a plurality of elastic members that are disposed separately and intermittently in a plurality of places.

9. The electronic apparatus according to claim 1, wherein the guide member of the elastic member biases the cover in a direction opposite to the bottom wall.

10. An electronic apparatus comprising:
    a body;
    a display unit rotatably connected to the body, the display unit comprises:
    a display device,
    a cover including a bottom wall and a side wall, the cover positioned on a first side of the display device,
    a mask positioned over a second side of the display device, the second side being opposite the first side of the display device,
    a rib disposed between a side portion of the display device and the side wall of the cover, and
    an elastic member attached to at least one of a surface of the rib, the elastic member includes a first cushioning member having a first surface in contact with a side portion of the display device and a guide member made of a flexible material and positioned between the display device and the first cushioning member, the guide member including an inclined surface that extends from the first surface and comes into contact with the mask.

11. The electronic apparatus according to claim 10, wherein the first cushioning member of the elastic member applying a restoring force that urges the display device inward with respect to the rib.

12. The electronic apparatus according to claim 10, wherein the elastic member of the display unit further comprises:
    a shock absorbing member that is deformed to damp a load transmitted to the display device when shock is applied on the display unit.

13. The electronic apparatus according to claim 10, wherein the elastic member of the display unit further comprises:
    a first shock absorbing member abutting on the first side of the display device, the first side being a non-display surface of the display device;
    a second shock absorbing member having a contact surface along a direction of crossing the display surface and attached to the inner surface of the rib facing the side portion of the display device; and
    a second cushioning member abutting on the non-display surface of the display device and having restoring force that urges the display device toward a side opposite to the bottom wall.

14. The electronic apparatus according to claim 13, wherein the side portion of the display device is shaped like a rectangle;
    the second shock absorbing member comprises a plurality of second shock absorbing members; and
    a distance between the contact surface of the second shock absorbing members arranged along opposite surfaces of the display device corresponding to opposite sides of the rectangle are set to be larger than a maximum value within tolerable production error of a distance between opposite surfaces of the side portion of the display device.

15. The electronic apparatus according to claim 13, wherein the inclined surface of the guide member extends from the contact surface of the second cushioning member upwardly and outwardly to the side portion of the display device.

16. The electronic apparatus according to claim 13, wherein the side portion of the display device is shaped like a rectangle;

the second shock absorbing member comprises a plurality of second shock absorbing members; and the first cushioning member comprise a plurality of cushioning members disposed along two adjacent sides of the rectangle.

17. The electronic apparatus according to claim 10, wherein the rib has a reinforcing rib extending to a side opposite to the display device.

18. The electronic apparatus according to claim 10, wherein the guide member of the elastic member biases the cover in a direction opposite to the bottom wall.

19. A display unit, comprising:

a display device;

a cover including a bottom wall and a side wall, the cover positioned on a non-displaying surface of the display device;

a mask positioned a perimeter of a display surface of the display device;

a rib disposed between a side portion of the display device and the side wall of the cover; and an elastic member attached to a surface of the rib, the elastic member includes a cushioning member having a first surface in contact with a side portion of the display device and a guide member made of a flexible material and positioned between the display device and the cushioning member, the guide member including an inclined surface that extends from the first surface of the cushioning member and comes into contact with the mask.

20. The display unit according to claim 19, wherein the guide member of the elastic member biases the cover in a direction opposite to the bottom wall.

21. The display unit according to claim 19, wherein one side of the rib is connected to the bottom wall and extends towards the cover.

\* \* \* \* \*